Oct. 2, 1928.  
C. A. WALTERS  
1,686,193  
AUTOMOBILE DRIVING MECHANISM FOR IMPLEMENTS  
Filed July 25, 1927
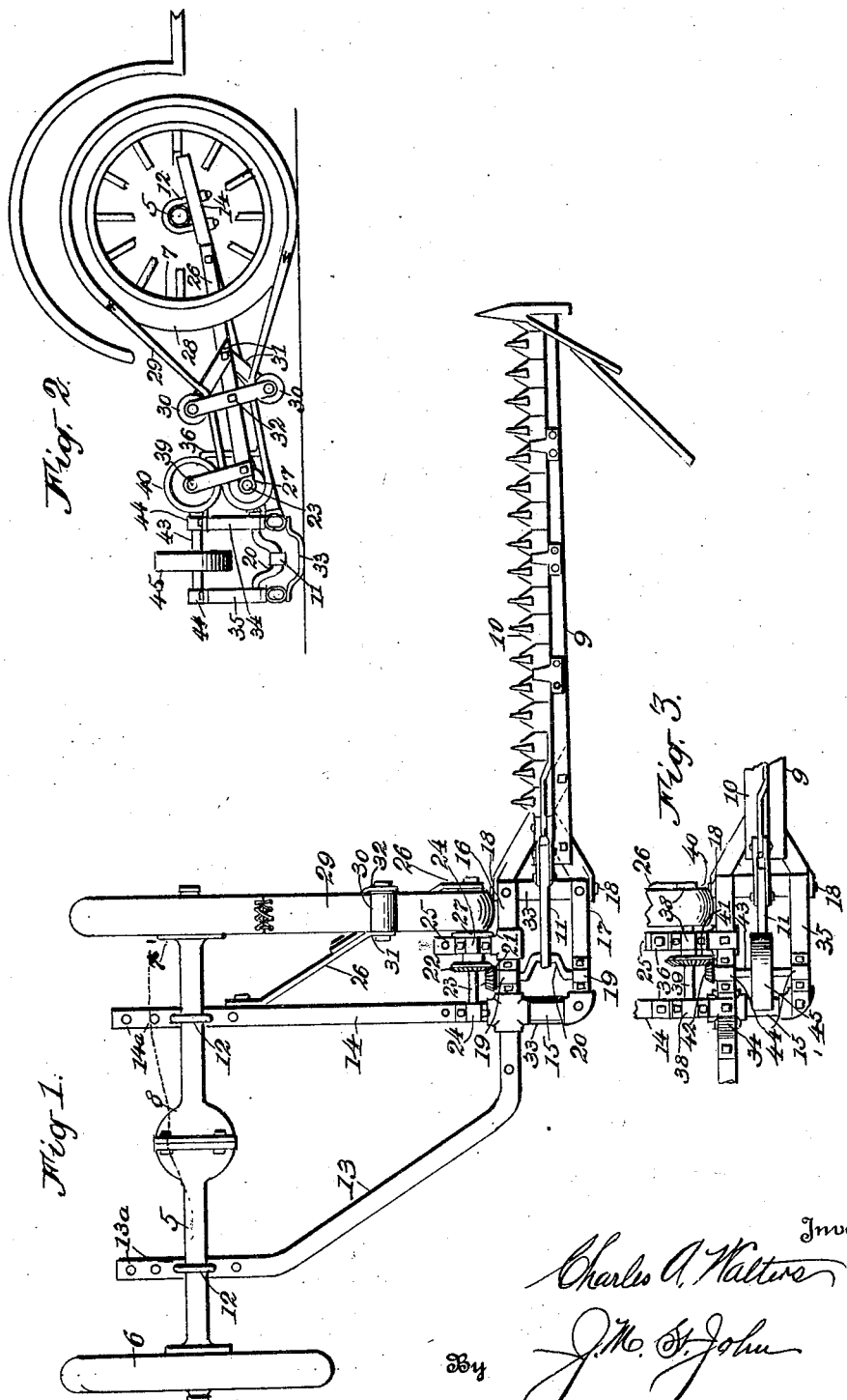

Patented Oct. 2, 1928.

1,686,193

UNITED STATES PATENT OFFICE.

CHARLES A. WALTERS, OF MARION, IOWA.

AUTOMOBILE DRIVING MECHANISM FOR IMPLEMENTS.

Application filed July 25, 1927. Serial No. 208,215.

This invention relates to the adaptation of a motor vehicle to power purposes, such as the operating of a farm implement, transmission of power to machinery, and the like. The object of the invention is to make it possible to belt directly to one of the driving wheels of the motor vehicle and operate connected mechanism whether the vehicle be traveling over the ground, or stationary.

The invention is fully disclosed in the description and claims following, reference being had to the accompanying drawing, in which:—

Fig. 1 is a plan view of apparatus embodying the invention. Fig. 2 is a side elevation of the same, with the mower sickle-bar of Fig. 1 removed. Fig. 3 is a plan view of power-transmitting apparatus shown in Fig. 2, but omitted in Fig. 1, the better to show the parts below it.

In the drawing, the numeral 5 denotes the rear axle of an automobile, carrying the usual power wheels 6—7. As is well known the differential enclosed in the casing 8 is such that propulsion is imparted to the vehicle when both these wheels are in contact with the roadway, and to one of them when the axle is jacked up on that side, and the other wheel is anchored. In this invention advantage is taken of this fact, and the apparatus operates eqully well for operating a moving implement, such as a mower, as for operating a stationary machine, a grinder, feed-cutter, or the like.

For the purposes of this application the automobile is shown in operative connection with a mower, the essential parts of which are herein shown as the sickle-bar 9, sickle 10 and pitman 11.

To the rear axle of the automobile is attached by stirrup-bolts 12, a frame to carry the sickle-bar and the sickle-actuating mechanism. The frame is herein shown as made up of gas-pipe and fittings, but may be of structural steel, or castings, as desired. A pair of bars 13 and 14 is attached to the axle, as above mentioned, and connects rearwardly with a laterally extending frame, to which the sickle-bar and the driving mechanism are attached. The bar 13 is disposed diagonally, and serves to brace the structure against side strain. The lateral extension is composed mainly of members 15, 16 and 17, to the last two members of which the sickle-bar is hinged at 18. In bearings 19 attached to the lateral bars is mounted a crank-shaft 20, which transmits motion to the sickle by a pitman 11. The inner end of the crank shaft carries a pinion 21 in mesh with a bevel gear 22 on a jack-shaft 23 journaled in bearings 24, one of which is attached to the bar 14 and the other to a stub 25 projecting forwardly from the member 16. Between the bearings the jack-shaft carries a pulley 27, much crowned, and approximating the peripheral curvature of the automobile tires 28, to one of which the pulley is connected by a belt 29. This belt is inwardly concaved so as to fit the periphery of the tire, and in practice may consist of lengths of the tread portions of ordinary tire casings laced together. Any tendency the belt might have to run off the pulley is restrained by an outboard bearing 26 formed as a diagonal brace and guard and attached forwardly to the bar 14. To give greater superficial contact of the belt with the wheel and pulley it is deflected inwardly by idlers 30 carried by brackets 31 and 32. The whole structure is supported rearwardly by shoes 33 upturned at the front and rear so as to slide freely in either direction on the ground.

As shown in Fig. 2 the belt in the operation of the mower travels on the ground, so that both drive-wheels of the automobile are in tractive relation to the differential. In the forward movement the apparatus serves for mowing grass both rapidly and well. It may also be turned and backed as freely as may the automobile alone.

To adapt the apparatus for use in the driving of stationary machinery a super-frame is attached to the main frame, and serves as a support for auxiliary power-transmitting mechanism. The frame comprises a pair of standards 34 and 35, and a pair of knees 36 disposed at right angles to the standards, and supported at the foot by the bar 14 and stub 25. The knees carry bearings 38 for a jacket-shaft 39 provided with a high-crowned pulley 40 and a bevel gear 41. The gear meshes with a pinion 42 on a transmission shaft 43 journaled in bearings 44 attached to the standards. This shaft may serve for direct connection with machinery, or serve as a counter-shaft carrying a pulley 45. To operate stationary machinery it is only necessary to anchor the automobile, jack up the wheel 7, and shift the belt from the lower to the upper pulley.

A series of stirrup-bolt holes 13ª and 14ª permits a shifting of the main frame so that the apparatus may be attached to any automobile, regardless of the size of its driving wheels.

Having thus described my invention, I claim:

1. Combined with an automoible driving wheel, a frame in fixed relation thereto, a driving pulley carried by said frame, and an inwardly concaved belt connecting the wheel and pulley, and adapted to operate tractively as the automobile moves over the ground.

2. Combined with an automobile, a rearwardly extending frame clamped to the rear axle, a mower sickle-bar connecting laterally with said frame, a jack-shaft, crank-shaft and connecting gearing carried by the frame, a pulley on the jack-shaft aligned with one of the automobile driving wheels, a connecting, inwardly concave belt, and a pitman connecting the sickle and the crank-shaft.

3. Combined with an automobile, a rearwardly extending frame clamped to the rear axle and extended laterally behind one of the driving wheels, supporting shoes therefor, a mower sickle-bar connecting with said frame laterally, a jack-shaft provided with a crowned pulley in line with one of the drive wheels, an inwardly concaved belt connecting the pulley and drive wheel tractively, and a crank-shaft, pitman and bevel gearing to transmit motion from said pulley to the sickle.

In testimony whereof I affix my signature.

CHARLES A. WALTERS.